(12) United States Patent
Song et al.

(10) Patent No.: US 9,570,739 B2
(45) Date of Patent: Feb. 14, 2017

(54) COMPOSITE POSITIVE ACTIVE MATERIAL, METHOD OF PREPARING THE SAME, AND POSITIVE ELECTRODE AND LITHIUM BATTERY CONTAINING THE MATERIAL

(71) Applicant: Samsung SDI Co., Ltd., Yongin-si, Gyeonggi-do (KR)

(72) Inventors: Jay-Hyok Song, Yongin-si (KR);
Jun-Seok Park, Yongin-si (KR);
Evgeniya Matulevich, Yongin-si (KR);
Chang-Wook Kim, Yongin-si (KR);
Yong-Chan You, Yongin-si (KR);
Sun-Ho Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 490 days.

(21) Appl. No.: 13/957,351

(22) Filed: Aug. 1, 2013

(65) Prior Publication Data

US 2014/0242468 A1    Aug. 28, 2014

Related U.S. Application Data

(60) Provisional application No. 61/770,911, filed on Feb. 28, 2013.

(51) Int. Cl.

| H01M 4/13 | (2010.01) |
|---|---|
| H01M 4/58 | (2010.01) |
| H01M 4/50 | (2010.01) |
| H01M 4/00 | (2006.01) |
| H01M 4/485 | (2010.01) |
| H01M 4/505 | (2010.01) |
| H01M 4/525 | (2010.01) |
| H01M 4/1315 | (2010.01) |

(Continued)

(52) U.S. Cl.
CPC .......... *H01M 4/485* (2013.01); *C01G 45/1257* (2013.01); *C01G 53/50* (2013.01);
(Continued)

(58) Field of Classification Search
USPC .......... 429/231.95, 223, 224, 231.6
(Continued)

(56) References Cited

U.S. PATENT DOCUMENTS 5,773,168 A * 6/1998 Kubo .................. H01M 4/525
29/623.5
7,205,072 B2  4/2007 Kang et al.
(Continued)

FOREIGN PATENT DOCUMENTS

EP    1 909 345 A1    4/2008
EP    2 521 211 A1    11/2012
(Continued)

OTHER PUBLICATIONS

EPO Search Report dated Jun. 13, 2014, for corresponding European Patent application 13178804.4, (6 pages).
(Continued)

*Primary Examiner* — Patrick Ryan
*Assistant Examiner* — Julian Anthony
(74) *Attorney, Agent, or Firm* — Lewis Roca Rothgerber Christie LLP

(57) ABSTRACT

A composite positive active material including an over-lithiated lithium transition metal oxide, the over-lithiated transition metal oxide including a compound represented by Formula 1 or Formula 3: [Formula 1] $xLi_{2-y}M''_yMO_3\text{-}(1\text{-}x)LiM'O_2$, [Formula 3] $xLi_{2-y}M''_yMO_3\text{-}x'LiM'O_2\text{-}x''Li_{1+d}M'''_{2-d}O_4$, $x+x'+x''=1$, $0<x<1$, $0<x'<1$, $0<x''<1$, $0<y\le1$, and $0\le d\le 0.33$, is disclosed. A positive electrode and a lithium battery containing the composite positive active material, and a method of preparing the composite positive active material are also disclosed.

12 Claims, 9 Drawing Sheets

(51) Int. Cl.
*C01G 45/12* (2006.01)
*C01G 53/00* (2006.01)
*H01M 4/1391* (2010.01)

(52) U.S. Cl.
CPC ......... *H01M 4/1315* (2013.01); *H01M 4/505* (2013.01); *H01M 4/525* (2013.01); *C01P 2002/50* (2013.01); *C01P 2002/52* (2013.01); *C01P 2004/04* (2013.01); *H01M 4/1391* (2013.01); *Y02E 60/122* (2013.01)

(58) Field of Classification Search
IPC .................................................... H01M 4/131
See application file for complete search history.

(56) References Cited

U.S. PATENT DOCUMENTS

| | | | | |
|---|---|---|---|---|
| 7,258,821 | B2 * | 8/2007 | Yang | ............... H01M 4/131 252/519.15 |
| 7,732,096 | B2 | 6/2010 | Thackeray et al. | |
| 2002/0136954 | A1 | 9/2002 | Thackeray et al. | |
| 2010/0086854 | A1 | 4/2010 | Kumar et al. | |
| 2013/0142944 | A1 | 6/2013 | Venkatachalam et al. | |

FOREIGN PATENT DOCUMENTS

| | | |
|---|---|---|
| JP | 2012-505520 A | 3/2012 |
| KR | 10-2011-0076955 | 7/2011 |
| KR | 10-2012-0030951 A | 3/2012 |

OTHER PUBLICATIONS

S.H. Kang et al, The Effects of Acid Treatment on the Electrochemical Properties of 0.5 $Li_2MnO_3 \cdot 0.5$ $LiNi_{0.44}CO_{0.25}Mn_{0.31}O_2$ Electrodes in Lithium Cells, Journal of the Electrochemical Society 153(6), pp. A 1186-A 1192 (2006).

KIPO Office Action dated Nov. 30, 2016, for corresponding Korean Patent Application No. 10-2013-0157522 (6 pages).

* cited by examiner

COMPOSITE POSITIVE ACTIVE MATERIAL, METHOD OF PREPARING THE SAME, AND POSITIVE ELECTRODE AND LITHIUM BATTERY CONTAINING THE MATERIAL

CROSS-REFERENCE TO RELATED APPLICATION

This application claims priority to and the benefit of U.S. Provisional Application No. 61/770,911, filed on Feb. 28, 2013, in the U.S. Patent and Trademark Office, the entire content of which is incorporated herein by reference.

BACKGROUND

1. Field

Embodiments according to the present invention are directed toward a composite positive active material, a positive electrode and a lithium battery containing the composite positive active material, and a method of preparing the composite positive active material.

2. Description of the Related Art

In general, for use as a positive active material for a lithium battery, an oxide of a transition metal compound and lithium is used and examples of such an oxide include $LiNiO_2$, $LiCoO_2$, $LiMn_2O_4$, $LiFePO_4$, $LiNi_xCO_{1-x}O_2$ ($0 \leq x \leq 1$), and $LiNi_{1-x-y}Co_xMn_yO_2$ ($0 \leq x \leq 0.5$, $0 \leq y \leq 0.5$). However, such positive active materials have limited electric capacity.

Accordingly, positive electrode materials having various structures have been suggested. For example, according to the demand for high-capacity batteries, a composite-based oxide has been used as an alternative.

For example, from among such composite-based oxides, there is $Li_2MO_3$—$LiMeO_2$ (wherein M and Me are transition metal) having a layered structure as an example. The composite-based oxide having a layered structure enables intercalation/deintercalation of a great (e.g., large) amount of Li ions, as compared to other positive active materials, and thus, it has high capacity properties. However, since much lithium is released from $Li_2MO_3$, a structural change may occur during charging/discharging cycles and an average voltage decreases due to the translocation of transition metal atoms into empty Li ion sites.

Accordingly, a positive active material with high capacity and improved lifetime properties and high-rate properties is still desired.

SUMMARY

Aspects of embodiments according to the present invention provide a composite positive active material having improved lifetime properties.

Aspects of embodiments according to the present invention also provide a method of preparing the composite positive active material.

Aspects of embodiments according to the present invention also provide a positive electrode including the composite positive active material.

Aspects of embodiments according to the present invention also provide a lithium battery including the positive electrode.

According to an embodiment of the present invention, a composite positive active material includes an over-lithiated lithium transition metal oxide, the over-lithiated transition metal oxide including a compound represented by Formula 1 or Formula 3 below:

$$xLi_{2-y}M''_yMO_3\text{-}(1-x)LiM'O_2 \quad \text{[Formula 1]}$$

In Formula 1, M is at least one metal that has an average oxidation number of +4 and that is selected from Period 4 transition metals and Period 5 transition metals, M' is at least one metal that has an average oxidation number of +3 and that is selected from Period 4 transition metals and Period 5 transition metals, M'' is different from M and is at least one metal cation selected from Periods 2 to 7 elements, and $0 < x < 1$ and $0 < y \leq 1$.

$$xLi_{2-y}M''_yMO_3\text{-}x'LiM'O_2\text{-}x''Li_{1+d}M'''_{2-d}O_4 \quad \text{[Formula 3]}$$

In Formula 3, M is at least one metal selected from Period 4 transition metals and Period 5 transition metals and having an average oxidation number of +4, M' is at least one metal selected from Period 4 transition metals and Period 5 transition metals and having an average oxidation number of +3, M''' is at least one metal selected from Period 4 transition metals and Period 5 transition metals and having an average oxidation number from +3 to +4, and M'' is different from M, M' and M''' and is at least one metal cation selected from Period 2 to Period 7 elements, $x+x'+x''=1$, $0<x<1$, $0<x'<1$, $0<x''<1$, $0<y\leq 1$, and $0 \leq d \leq 0.33$.

In the over-lithiated lithium transition metal oxide of Formula 1, M'' is doped in a Li ion layer of $Li_{2-y}M''_yMO_3$.

In some embodiments, in Formula 1 or Formula 3, $0<x<0.6$ and $0<y<0.1$.

In some embodiments, the over-lithiated transition metal oxide further includes fluorine.

In some embodiments, M is at least one metal selected from Mn, Ti, Zr, Sn and Mo.

In some embodiments, M' is at least one metal selected from Ni, Co, Mn, Fe, Al, Mg, Zn, Cu, Cr, V, and Nb.

In some embodiments, M'' is at least one metal cation selected from Mg, Al, Ca, Sc, Ti, V, Cr, Mn, Fe, Co, Ni, Cu, Zn, Ga, Sr, Y, Zr, Nb, Mo, Ru, Rh, Pd, Ag, Cd, and In.

In some embodiments, the over-lithiated lithium transition metal oxide includes a compound represented by Formula 2:

$$xLi_{2-y}M''_yMnO_3\text{-}(1-x)LiNi_aCo_bMn_cO_2 \quad \text{[Formula 2]}$$

In some embodiments, in Formula 2, $0<x<1$, $0<y\leq 1$, $0<a<1$, $0<b<1$, $0<c<1$, $a+b+c=1$, and M'' is different from Mn and is at least one metal cation selected from Period 2 to Period 7 elements.

In some embodiments, the over-lithiated lithium transition metal oxide is included in particles having an average particle size from about 10 nm to about 500 μm.

According to another embodiment of the present invention, a lithium battery includes: a positive electrode including the composite positive active material; a negative electrode facing the positive electrode; and an electrolyte between the positive electrode and the negative electrode.

According to still another embodiment of the present invention, a composite active material including an over-lithiated lithium transition metal oxide, the over-lithiated lithium transition metal oxide including a compound represented by Formula 9:

$$xLi_2MO_3\text{-}(1-x)LiM'O_2 \quad \text{[Formula 9]}$$

In some embodiments, in Formula 9, M is at least one metal selected from Period 4 transition metals and Period 5 transition metals and having an average oxidation number of +4, M' is at least one metal selected from Period 4 transition metals and Period 5 transition metals and having an average oxidation number of +3, a portion y of Li in a Li ion layer of the over-lithiated lithium transition metal oxide is replaced with at least one metal cation selected from Period 2 to Period 7 elements, 0<y≤1, and 0<x<1.

According to still another embodiment of the present invention, a method of preparing a composite positive active material includes: treating an over-lithiated transition metal oxide with an acid, and doping the acid-treated over-limited lithium transition metal oxide with a metal cation.

In some embodiments, the over-lithiated lithium transition metal oxide includes a compound represented by Formula 4 below.

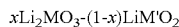
$x\text{Li}_2\text{MO}_3\text{-}(1\text{-}x)\text{LiM'O}_2$      [Formula 4]

In some embodiments, in Formula 4, M is at least one metal selected from Period 4 transition metals and Period 5 transition metals and having an average oxidation number of +4, M' is at least one metal selected from Period 4 transition metals and Period 5 transition metals, and 0<x<1.

In some embodiments, the over-lithiated lithium transition metal oxide further includes fluorine.

In some embodiments, the fluorine is present in a ratio of about 10 mol % or less based on the total moles of the transition metal contained in the over-lithiated lithium transition metal oxide.

In some embodiments, the doping of the acid-treated over-lithiated lithium transition metal oxide is performed using a doping solution and, based on the total weight of the doping solution, the metal cation is present in the doping solution in an amount in a range of about 0.01 to about 5.00 wt %.

In some embodiments, the method further includes heat treating the doped over-lithiated lithium transition metal oxide under atmospheric conditions at a temperature of about 10 to about 100° C.

In some embodiments, the treating of the over-lithiated lithium transition metal oxide with the acid is performed using an acid solution including at least one acid selected from nitric acid, sulfuric acid, hydrochloric acid, citric acid, fumaric acid, maleic acid, boric acid and phosphoric acid.

In some embodiments, the method further includes drying the over-lithiated lithium transition metal oxide at a temperature from about 200° C. to about 500° C. after the treating of the over-lithiated lithium transition metal oxide with the acid and before the doping of the acid-treated over-lithiated lithium transition metal oxide with the metal cation.

In some embodiments, the doping is performed using a doping solution including a salt of at least one metal cation M" different from M, and M" is at least one metal cation selected from Period 2 to Period 7 elements.

According to an aspect according to an embodiment of the present invention, provided is a positive electrode including the composite positive active material.

According to an aspect according to an embodiment of the present invention, provided is a lithium battery including the positive electrode.

According to aspects according to embodiments of the present invention, a lithium battery including a composite positive active material according to an embodiment of the present invention suppresses a change in a discharge curve during charging and discharging at high voltage to improve capacity and lifetime properties of the lithium battery.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
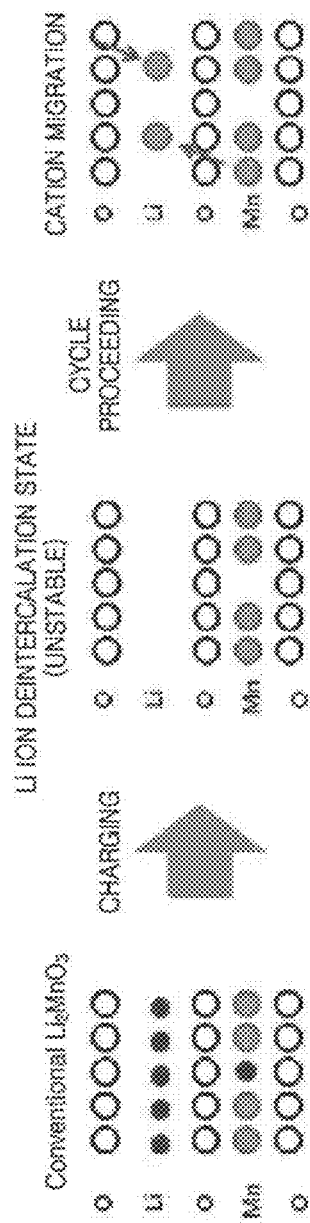
FIG. 1 is a schematic diagram showing a change in a $\text{Li}_2\text{MnO}_3$ phase of an over-lithiated lithium transition metal oxide during charging and discharging.

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Hereinafter, embodiments of the present invention are described in more detail.

A composite positive active material according to an embodiment of the present invention includes an over-lithiated lithium transition metal oxide represented by Formula 1 or Formula 3 below:

$$xLi_{2-y}M''_yMO_3\text{-}(1-x)LiM'O_2 \qquad \text{[Formula 1]}$$

$$xLi_{2-y}M''_yMO_3\text{-}x'LiM'O_2\text{-}x''Li_{1+d}M'''_{2-d}O_4 \qquad \text{[Formula 3]}$$

In some embodiments, for example, in Formula 1, M is at least one metal that has an average oxidation number of +4 and that is selected from a Period 4 transition metal and a Period 5 transition metal, M' is at least one metal that has an average oxidation number of +3 and that is selected from a Period 4 transition metal and a Period 5 transition metal, M'' is different from M and is at least one metal cation selected from Periods 2 to 7 elements, and $0<x<1$ and $0<y\le 1$. In some embodiments, in Formula 3, M is at least one metal selected from a Period 4 transition metal and a Period 5 transition metal and having an average oxidation number of +4, M' is at least one metal selected from a Period 4 transition metal and a Period 5 transition metal and having an average oxidation number of +3, M''' is at least one metal selected from a Period 4 transition metal and a Period 5 transition metal and having an average oxidation number from +3 to +4, and M'' is different from M, M' and M''' and is at least one metal cation selected from a Period 2 to Period 7 element, $x+x'+x''=1$, $0<x<1$, $0<x'<1$, $0<x''<1$, $0<y\le 1$, and $0\le d\le 0.33$. In this regard, x and y are determined based on mole (e.g., molar amounts). For example, in some embodiments, such as in Formula 1, $0<x<0.6$ and $0<y<0.1$.

The over-lithiated lithium transition metal oxide may be either a composite having a layered structure or a solid solution. In some cases, the over-lithiated lithium transition metal oxide may exist as a combination of a composite having a layered structure and a solid solution.

In some embodiments, the over-lithiated lithium transition metal oxide represented by Formula 1 contains excess Li in a transition metal layer of LiM'O$_2$, and excess Li is contained in the form of a Li$_2$MO$_3$ phase (which has high capacity and stability at high voltage) in LiM'O$_2$ having the layered structure, and accordingly, the composite positive active material has high capacity and structural stability.

In some embodiments, for example, in Formula 1 or Formula 3, a metal cation M'' is doped in a Li ion layer of Li$_2$MnO$_3$ phase (e.g., a Li ion layer of Li$_{2-y}$M''$_y$MO$_3$), and, thus, even when a Li ion is deintercalated from the Li$_2$MnO$_3$ phase during charging and discharging, structural stability of Li$_2$MnO$_3$ may be maintained due to the presence of M'' in the Li ion layer, because even when charging and discharging cycles proceed, the metal cation M'' may not migrate, thereby suppressing a change in a discharging curve of a battery including the composite positive active material. In some embodiments, in Formula 1 or Formula 3, a metal cation M'' that is different from Mn is doped in a Li ion layer of Li$_{2-y}$M''$_y$MO$_3$.

Figure 2:
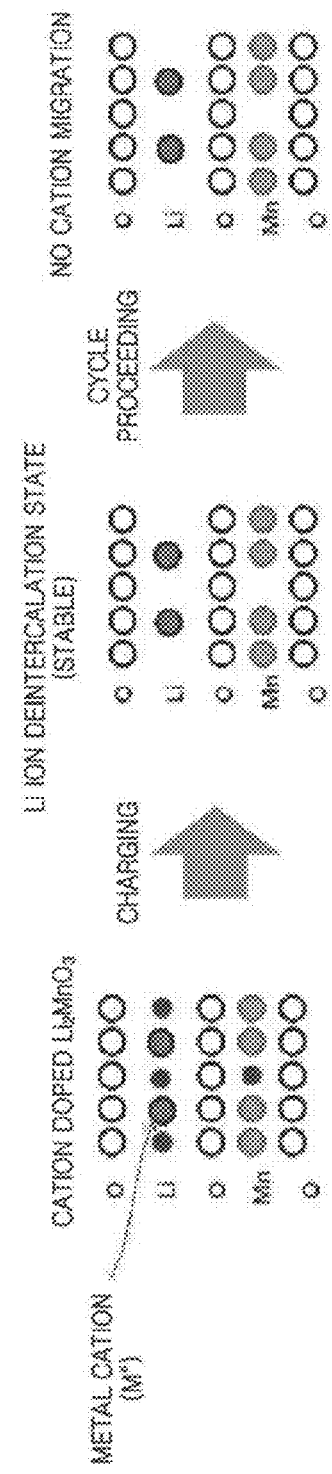
FIG. 2 is a schematic diagram showing a change in a $\text{Li}_2\text{MnO}_3$ phase of a composite positive active material according to an embodiment of the present invention during charging and discharging.

FIG. 1 is a schematic view showing a change during charging and discharging in Li$_2$MnO$_3$ phase of an over-lithiated lithium transition metal oxide that does not include a metal cation in a Li ion layer (e.g., does not include a metal cation in a Li ion layer of Li$_{2-y}$M''$_y$MO$_3$). FIG. 2 is a schematic view showing a change during charging and discharging in Li$_2$MnO$_3$ phase of a composite positive active material according to an embodiment of the present invention.

As illustrated in FIG. 1, in an over-lithiated lithium transition metal oxide that does not include a metal cation in a Li ion layer, during charging, Li$_2$MnO$_3$ phase from which lithium ions are deintercalated is unstable, and thus, when charging and discharging cycles proceed, a cation, such as Mn, present in the lithium transition metal oxide may migrate to a Li ion layer of Li$_2$MnO$_3$ phase. This may induce a decrease in capacity and a change in a discharging curve. Accordingly, it is difficult to apply an over-lithiated lithium transition metal oxide that does not include a metal cation in a Li ion layer into a commercially available battery.

On the other hand, in the case of the composite positive active material according to an embodiment of the present invention, the over-lithiated lithium transition metal oxide has a Li ion layer of Li$_2$MnO$_3$ (e.g., a Li ion layer of Li$_{2-y}$M''$_y$MO$_3$) doped with a metal cation (e.g., M''), and thus, as shown in FIG. 2, during charging, the deintercalation state of lithium ions in the Li$_2$MnO$_3$ phase is stabilized, and even when charging and discharging cycles proceed, metal cations do not migrate into the Li ion layer of the active material. Accordingly, a change in discharging curve is suppressed, and thus, capacity and lifetime properties may be improved.

In Formula 1, M may be, for example, at least one metal selected from Mn, Ti, Zr, Sn, and Mo, and M' may be, for example, at least one metal selected from Ni, Co, Mn, Fe, Al, Mg, Zn, Cu, Cr, V, and Nb.

Also, in some embodiments, M'' in Formula 1 is at least one metal cation selected from Periods 2 to 7 elements, and is selected from metal cations that are different from M. M'' may be, for example, at least one metal cation selected from Mg, Al, Ca, Sc, Ti, V, Cr, Mn, Fe, Co, Ni, Cu, Zn, Ga, Sr, Y, Zr, Nb, Mo, Ru, Rh, Pd, Ag, Cd, and In. M'' may be, for example, selected from metal cations, such as Al, Mn, Cr, Zn, Ga, Mg, V, Zr, or the like.

Regarding the over-lithiated lithium transition metal oxide, a doping amount (y) of M'' may satisfy the condition of $0<y\le 1$, for example, the condition of $0<y<0.1$. When the doping amount of metal cation is too great and thus y exceeds 1, an amount of Li ions in Li$_{2-y}$M''$_y$MO$_3$ is relatively small, leading to a decrease in a charging amount (or capacity) of the composite positive active material.

In an embodiment according to the present invention, a composite positive active material includes an over-lithiated transition metal oxide, the over-lithiated transition metal including a compound represented by Formula 9:

$$xLi_2MO_3\text{-}(1-x)LiM'O_2 \qquad \text{[Formula 9]}$$

In some embodiments, for example, in Formula 9, M is at least one metal selected from a Period 4 transition metal and a Period 5 transition metal and having an average oxidation number of +4, M' is at least one metal selected from a Period 4 transition metal and a Period 5 transition metal and having an average oxidation of +3, a portion y of Li in a Li ion layer of the over-lithiated lithium transition metal oxide is replaced with at least one metal cation selected from a Period 2 to a Period 7 element, $0<y\le 1$, and $0<x<1$. For example, in Formula 9, a portion y of Li in a Li ion layer of Li$_2$MO$_3$ of the over-lithiated lithium transition metal oxide is replaced with at least one metal cation selected from a Period 2 to a Period element.

The over-lithiated lithium transition metal oxide may include, for example, a compound represented by Formula 2 below:

$$xLi_{2-y}M''_yMnO_3\text{-}(1-x)LiNi_aCo_bMn_cO_2 \qquad \text{[Formula 2]}$$

In some embodiments, for example, in Formula 2, $0<x<1$, $0<y\le 1$, $0<a<1$, $0<b<1$, $0<c<1$, and $a+b+c=1$, and M'' is the same as described above.

For example, $0<x<0.6$ and $0<y<0.1$.

In some embodiments, the over-lithiated metal oxide includes a compound represented by Formula 3 below:

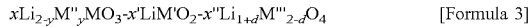
$$xLi_{2-y}M''_yMO_3\text{-}x'LiM'O_2\text{-}x''Li_{1+d}M'''_{2-d}O_4 \quad \text{[Formula 3]}$$

In some embodiments, $x+x'+x''=1$; $0<x<1$, $0<x'<1$, $0<x''<1$; $0<y\le1$; and $0\le d\le0.33$, M is at least one metal that has an average oxidation number of +4 and that is selected from a Period 1 transition metal and a Period 2 transition metal, M' is at least one metal that has an average oxidation number of +3 and that is selected from a Period 1 transition metal and a Period 2 transition metal, M''' is at least one metal that has an average oxidation number of a combination of +3 and +4 and that is selected from a Period 1 transition metal and a Period 2 transition metal, M'' is at least one metal cation that is different from M, M' and M''' and that is selected from Periods 2 to 7 elements.

The over-lithiated lithium transition metal oxide may be a particle having an average particle size of about 10 nm to about 500 μm. For example, an average particle size of the overlithiated lithium transition metal oxide may be in a range of about 10 nm to about 100 μm, or about 10 nm to about 50 μm. When the average particle size is within the foregoing ranges, a lithium battery having improved properties may be provided. Furthermore, the over-lithiated lithium transition metal oxide may be, for example, a nanoparticle having an average particle size of about 500 nm or less, about 200 nm or less, about 100 nm or less, about 50 nm or less, or about 20 nm or less. The nanoparticle shape may contribute to an increase in an assembly density of a positive electrode plate, thereby enhancing high rate discharging properties. In addition, when the over-lithiated lithium transition metal oxide is a nanoparticle having a particle size in the foregoing ranges, a specific surface area of the electrode plate reduces and thus reactivity with an electrolytic solution decreases, and thus, cyclic properties (e.g., charge/discharge cycling properties) may improve.

The over-lithiated lithium transition metal oxide may form a primary particle, or primary particles of the over-lithiated lithium transition metal oxide may agglomerate and/or bind to each other, or may be combined with other active materials to form a secondary particle.

A method of preparing a composite positive active material according to an embodiment of the present invention may include: treating an over-lithiated lithium transition metal oxide with a layered structure with an acid, and doping the acid-treated over-lithiated transition metal oxide with a metal cation, the over-lithiated transition metal oxide may include a compound represented by Formula 4 below:

$$xLi_2MO_3\text{-}(1\text{-}x)LiM'O_2 \quad \text{[Formula 4]}$$

In some embodiments, for example, in Formula 4, $0<x<1$, M is at least one metal that has an average oxidation number of +4 and that is selected from a Period 4 transition metal and a Period 5 transition metal, and M' is at least one metal that has an average oxidation number of +3 and that is selected from a Period 4 transition metal and a Period 5 transition metal.

In this regard, x is determined based on mole (e.g., molar amounts).

In some embodiments, the over-lithiated lithium transition metal oxide contains excess Li in a transition metal layer of LiM'O$_2$, and excess Li is contained in the form of Li$_2$MO$_3$ in LiM'O$_2$ having a layered structure. In the over-lithiated lithium transition metal oxide, some Li ions of the Li ion layer of Li$_2$MO$_3$ may be substituted with a metal cation by the acid treatment and the doping with a metal cation.

In Formula 4, M may be, for example, at least one metal selected from Mn, Ti, Zr, Sn, and Mo, and M' may be, for example, at least one metal selected from Ni, Co, Mn, Fe, Al, Mg, Zn, Cu, Cr, V, and Nb.

For example, the over-lithiated metal oxide may include a compound represented by Formula 5 below:

$$xLi_2MnO_3\text{-}(1\text{-}x)LiNi_aCo_bMn_cO_2 \quad \text{[Formula 5]}$$

In some embodiments, for example, in Formula 5, $0<x<1$, $0<a<1$, $0<b<1$, $0<c<1$, and $a+b+c=1$.

For example, the over-lithiated metal oxide may include a compound represented by Formula 6 below:

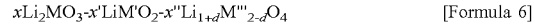
$$xLi_2MO_3\text{-}x'LiM'O_2\text{-}x''Li_{1+d}M'''_{2-d}O_4 \quad \text{[Formula 6]}$$

In some embodiments, for example, in Formula 6, $x+x'+x''=1$; $0<x<1$, $0<x'<1$, $0<x''<1$; and $0\le d\le0.33$, M is at least one metal that has an average oxidation number of +4 and that is selected from a Period 4 transition metal and a Period 5 transition metal, M' is at least one metal that has an average oxidation number of +3 and that is selected from a Period 4 transition metal and a Period 5 transition metal, and M''' is at least one metal that has an average oxidation number of a combination of +3 and +4 and that is selected from a Period 4 transition metal and a Period 5 transition metal.

In some embodiments, for example, in Formula 6, M is, for example, at least one metal selected from Mn, Ti, Zr, Sn, and Mo, M' is at least one metal selected from Ni, Co, Mn, Fe, Al, Mg, Zn, Cu, Cr, V, and Nb, and M''' is at least one metal selected from Ni, Co, Mn, Fe, Al, Mg, Zn, Cu, Cr, V and Nb.

As the over-lithiated lithium transition metal oxide, other than the compounds described above, additional examples include a compound represented by Formula 7 or Formula 8:

$$Li[Li_xMe_yM'_z]O_{2+d} \quad \text{[Formula 7]}$$

In some embodiments, for example, in Formula 7, $x+y=1$, $0<x<1$, and $0\le d\le0.1$, and Me is at least one metal selected from Mn, V, Cr, Fe, Co, Ni, Zr, Re, Al, B, Ge, Ru, Sn, Ti, Nb, Mo, and Pt.

$$Li[Li_xNi_aCo_bMn_c]O_{2+d} \quad \text{[Formula 8]}$$

In some embodiments, for example, in Formula 8, $x+a+b+c=1$; $0<x<1$, $0<a<1$, $0<b<1$, $0<c<1$; and $0\le d\le0.1$.

According to an embodiment of the present invention (e.g., any of Formulae 1-9), the over-lithiated lithium transition metal oxide may contain a fluorine (e.g., may further include fluorine). A fluorine-containing over-lithiated lithium transition metal oxide has high capacity properties and excellent lifetime properties. Fluorine may be contained in the over-lithiated lithium transition metal oxide in a ratio of about 10 mol % or less based on a total moles of the transition metal contained in the over-lithiated metal oxide. For example, a ratio of an amount of fluorine to a total amount of transition metal present in the over-lithiated lithium transition metal oxide may be about 10 mol % or less.

The treating (e.g., acid treatment) of the over-lithiated lithium transition metal oxide having a layered structure may be performed by using a solution including an acid (e.g., an acid solution), such as a nitric acid, a sulfuric acid, a hydrochloric acid, a citric acid, a fumaric acid, a maleic acid, a boric acid (H$_3$BO$_3$), a phosphoric acid, or the like. However, the acid treatment is not limited thereto. A concentration of an acid in the solution may be in a range of about 0.01 to about 5 M, and the acid may be diluted to have this range of concentration in water or an alcohol-based solvent, such as ethanol.

Through the treating (e.g., the acid treatment), Li ions of $Li_2MO_3$ phase of the over-lithiated lithium transition metal oxide may be substituted with hydrogen ions. The substitution of Li ions of $Li_2MO_3$ phase of the over-lithiated lithium transition metal oxide, not of Li ions of $LiM'O_2$ phase, with hydrogen ions by the treating (e.g., the acid treatment) is confirmed by referring to the Examples below.

Optionally, the acid treated over-lithiated lithium transition metal oxide may be subjected to drying at a temperature of about 200 to about 500° C. For example, the method according to an embodiment of the present invention may further include drying the over-lithiated lithium transition metal oxide at a temperature from about 200° C. to about 500° C. after the treating of the over-lithiated lithium transition metal oxide with the acid solution and before the doping of the acid-treated over-lithiated lithium transition metal oxide with the metal cation.

Then, the acid treated over-lithiated lithium transition metal oxide is doped with the metal cation.

The doping with the metal cation may be performed by using a doping solution containing a salt of at least one metal cation M" selected from Period 2 to Period 7 elements. In some embodiments, M" is a metal cation that is different from M, and may be, for example, at least one metal cation selected from Mg, Al, Ca, Sc, Ti, V, Cr, Mn, Fe, Co, Ni, Cu, Zn, Ga, Sr, Y, Zr, Nb, Mo, Ru, Rh, Pd, Ag, Cd, and In. M" may be, for example, selected from metal cations, such as Al, Mn, Cr, Zn, Ga, Mg, V, Zr, or the like. The salt of metal cation M" may be a hydrate, a sulfate, a nitrate, a carbonate, a halide, or the like of metal cation M".

The doping solution may be prepared by dissolving a salt of the metal cation M" in water or an alcohol, such as ethanol. A concentration of the doping solution may be appropriately controlled in consideration of an amount of the doping metal cation and a reaction condition. For example, based on the total weight of the doping solution, an amount of the salt of the metal cation in the doping solution may be in a range of about 0.01 to about 5.00 wt %.

In some embodiments, the acid-treated over-lithiated lithium transition metal oxide is added to the doping solution, and then, the mixture is stirred for about 1 to about 72 hours.

The method may further include heat treating the doped over-lithiated lithium transition metal oxide, and the heat treatment may be performed, for example, in atmospheric conditions at a temperature of about 10 to about 100° C.

By heat treating the doped over-lithiated lithium transition metal oxide, an over-lithiated lithium transition metal oxide including a Li ion layer of $Li_2MO_3$ phase doped with the metal cation M" may be obtained.

A positive electrode according to an embodiment of the present invention may include the composite positive active material.

For example, in some embodiments, a positive active material composition for the positive electrode is prepared by mixing the composite positive active material, a conductive agent, a binding agent, and a solvent. In some embodiments, the positive active material composition is directly coated on an aluminum current collector and dried to form a positive electrode plate including a positive active material layer. Alternatively, the positive active material composition may be cast on a separate support, and then a film exfoliated from the support is laminated on the aluminum current collector to prepare a positive plate including a positive active material layer.

Examples of the conductive agent include carbon black, graphite particulate, natural graphite, artificial graphite, acetylene black, ketjen black, carbon fiber; carbon nanotube; metal powder or metal fiber or metal tube, such as copper, nickel, aluminum, or silver; and a conductive polymer, such as polyphenylene derivative, but the conductive agent is not limited thereto and may be any one of various suitable conductive agents that are used in the art.

As a binding agent, a vinylidene fluoride/hexafluoropropylene copolymer, polyvinylidenefluoride, polyacrylonitrile, polymethylmethacrylate, polytetrafluoroethylene (PTFE), a mixture thereof, or a styrene butadiene rubber-based polymer may be used, and as a solvent, N-methylpyrrolidone (NMP), acetone, water, or the like may be used, but the solvent is not limited thereto.

In some embodiments, a plasticizer is further added to the positive active material composition to form pores in a resultant electrode plate.

Amounts of the composite positive active material, the conductive agent, the binder, and the solvent may be at the same (or substantially the same) levels as used in a typical lithium battery. According to the purpose and structure of a lithium battery, one or more of the conductive agent, the binding agent, and the solvent may not be used (e.g., may be omitted).

In addition, the positive electrode may further include, in addition to the composite positive active material, other suitable cathode active materials.

The positive active electrode may further include any one of various suitable lithium-containing metal oxides that are typically used in the art. For example, one or more of a composite oxide of lithium and metal selected from cobalt, manganese, nickel, and a combination thereof may be used, and a detailed example thereof is represented by any one of $Li_aA_{1-b}B_bD_2$ (wherein $0.90 \leq a \leq 1$, and $0 \leq b \leq 0.5$); $Li_aE_{1-b}B_bO_{2-c}D_c$ (wherein $0.90 \leq a \leq 1$, $0 \leq b \leq 0.5$, $0 \leq c \leq 0.05$); $LiE_{2-b}B_bO_{4-c}D_c$ (wherein $0 \leq b \leq 0.5$, $0 \leq c \leq 0.05$); $Li_aNi_{1-b-c}Co_bB_cD_\alpha$ (wherein $0.90 \leq a \leq 1$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, $0 < \alpha < 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, $0 < \alpha < 2$); $Li_aNi_bE_cG_dO_2$ (wherein $0.90 \leq a \leq 1$, $0 \leq b \leq 0.9$, $0 \leq c \leq 0.05$, $0.001 \leq d \leq 0.1$); $Li_aNi_bCo_cMn_dG_eO_2$ (wherein $0.90 \leq a \leq 1$, $0 \leq b \leq 0.9$, $0 \leq c \leq 0.05$, $0 \leq d \leq 0.5$, $0.001 \leq e \leq 0.1$.); $Li_aNiG_bO_2$ (wherein $0.90 \leq a \leq 1$, $0.001 \leq b \leq 0.1$); $Li_aCoG_bO_2$ (wherein $0.90 \leq a \leq 1$, $0.001 \leq b \leq 0.1$); $Li_aMnG_bO_2$ (wherein $0.90 \leq a \leq 1$, $0.001 \leq b \leq 0.1$); $Li_aMn_2G_bO_4$ (wherein $0.90 \leq a \leq 1$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \leq x \leq 0.5$, $0 \leq y \leq 0.5$), $FePO_4$ or the like may be used.

These compounds may have a coating layer on their surfaces, or these compounds may be mixed with a compound having a coating layer. The coating layer may include an oxide of a coating element, a hydroxide of the coating element, an oxyhydroxide of the coating element, an oxycarbonate of the coating element, or a hydroxycarbonate of the coating element. These compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed by using any one of various suitable coating methods that are performed using the compounds and the elements and do not affect properties of the cathode active material (for example, spray coating, immersion, or the like). These coating methods should be apparent to one of ordinary skill in the art and thus, are not described in detail herein.

The positive electrode current collector may have a thickness of about 3 to about 500 μm. The positive current collector may not be particularly limited as long as it does not cause a chemical change in a secondary battery and has conductivity, and examples of a material for forming the negative current collector include copper, stainless steel, aluminum, nickel, titanium, calcined carbon, and copper or stainless steel that is surface treated with carbon, nickel, titanium, silver, and an aluminum-cadmium alloy. In addition, the positive current collector may have a fine uneven structure at its surface to increase a binding force with respect to an electrode active material, and the positive current collector may have various suitable shapes, such as film, sheet, foil, net, porosity, foam, or non-woven shape.

An assembly density of the positive electrode may be at least about 2.0 g/cc.

A lithium battery according to an embodiment of the present invention includes a positive electrode including the composite positive active material. For example, the lithium battery may include a positive electrode including the composite positive active material; a negative electrode facing the positive electrode; and an electrolyte disposed between the positive electrode and the negative electrode.

The positive electrode in the lithium battery may be manufactured according to the above-described method of manufacturing the positive electrode.

Then, a negative electrode may be manufactured by using the following manner. The negative electrode may be manufactured in the same (or substantially the same) manner as used to manufacture the positive electrode, except that a negative active material is used instead of the composite positive active material. In addition, a conductive agent, a binding agent, and a solvent used in a negative active material composition may be the same (or substantially the same) as those used in the positive electrode.

For example, in some embodiments, a negative active material, a conductive agent, a binding agent, and a solvent are mixed to prepare a negative active material composition, and the negative active material composition is directly coated on a copper current collector to manufacture a negative electrode plate. Alternatively, in one embodiment, the negative active material composition is cast on a separate support, and a negative active material film exfoliated from the support is laminated on a copper current collector to manufacture a negative plate.

In addition, the negative active material may be any one of various suitable materials that are used as a negative active material for a lithium battery in the art. For example, the negative active material may include at least one selected from lithium metal, lithium-alloyable metal, transition metal oxide, non-transition metal oxide, and a carbonaceous material.

For example, the lithium-alloyable metal may be Si, Sn, Al, Ge, Pb, Bi, Sb, a Si—Y alloy (where Y is alkali metal, alkali earth metal, a Group 13 element, a Group 14 element, transition metal, rare-earth element, or a combination element thereof, and Y is not Si), or a Sn—Y alloy (Y is alkali metal, alkali earth metal, a Group 13 element, a Group 14 element, transition metal, rare-earth element, or a combination element thereof, and Y is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, or lithium vanadium oxide.

For example, the transition metal oxide may be $SnO_2$, $SiO_x$ (0<x<2), or the like.

The carbonaceous material may be crystalline carbon, amorphous carbon, or mixture thereof. The crystalline carbon may be natural or artificial graphite that is amorphous, tabular, flake, circular, or fibrous, and the amorphous carbon may be soft carbon (cold calcined carbon) or hard carbon, meso-phase pitch carbide, or calcined corks.

Amounts of the negative active material, the conductive agent, the binder, and the solvent may be at the same (or substantially the same) levels as used in a typical lithium battery.

The negative electrode current collector may have a thickness of about 3 to about 500 μm. The negative current collector may not be particularly limited as long as it does not cause a chemical change in a secondary battery and has conductivity, and examples of a material for forming the negative current collector include copper, stainless steel, aluminum, nickel, titanium, calcined carbon, and copper or stainless steel that is surface treated with carbon, nickel, titanium, silver, and/or an aluminum-cadmium alloy. In addition, the negative current collector may have a fine uneven structure to increase a binding force with respect to an electrode active material, and the negative current collector may have various shapes, such as film, sheet, foil, net, porosity, foam, or non-woven shape.

The positive electrode and the negative electrode may be separated by a separator, and the separator may be any one of various suitable separators that are used in a typical lithium battery. For example, a material that has low resistance to ion migration of an electrolyte and has excellent electrolytic solution retaining capability is suitable for a material for forming the separator. For example, the separator forming material may be selected from glass fiber, polyester, Teflon, polyethylene, polypropylene, polytetrafluoroethylene (PTFE), and a combination thereof, each of which may be in a non-woven fabric or woven fabric form. The separator may have a pore size of about 0.01 to about 10 μm, and a thickness of about 5 to about 300 μm.

In some embodiments, a lithium salt-containing non-aqueous electrolyte includes (or consists of) a non-aqueous electrolytic solution and lithium. The non-aqueous electrolyte may be a non-aqueous electrolytic solution, a solid electrolyte, or an inorganic solid electrolyte.

An example of the non-aqueous electrolytic solution is an aprotic solvent, and examples of the aprotic solvent as the non-aqueous electrolytic solution include N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethyl formamide, dioxolane, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, tetrahydrofuran derivative, ether, methyl propionate, and ethyl propionate.

Examples of an organic solid electrolyte include a polyethylene derivative, a polyethylene oxide derivative, a polypropylene oxide derivative, a phosphate ester polymer, poly agitation lysine, polyester sulfide, polyvinyl alcohol, poly fluoro vinylidene, an ionic decomposer-containing polymer.

Examples of the inorganic solid electrolyte include nitrides, halides, and sulfates of Li, such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, or $Li_3PO_4$—$Li_2S$—$SiS_2$.

The lithium salt may be any one of various materials that are typically used in a lithium battery, and a material that is easily dissolved in the non-aqueous based electrolyte may be used, and examples of such a material include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, low aliphatic lithium carbonate, 4 phenyl lithium borate, lithium imide, and a combination thereof.

The lithium battery according to an embodiment of the present invention may be a lithium ion battery, a lithium ion polymer battery, or a lithium polymer battery, which is classified according to the kind of a separator and an electrolyte, and may also be a cylindrical battery, a rectangular battery, a coin-shape battery, or a pouch-shape battery, which is classified according to the shape of a battery, and may also be a bulky battery or a thin film type battery, which is classified according to the size of a battery. In addition, the lithium battery may also be a lithium primary battery or a lithium secondary battery.

Methods of manufacturing these batteries are widely known in the art, and thus, further description thereof is not presented herein.

Figure 3:
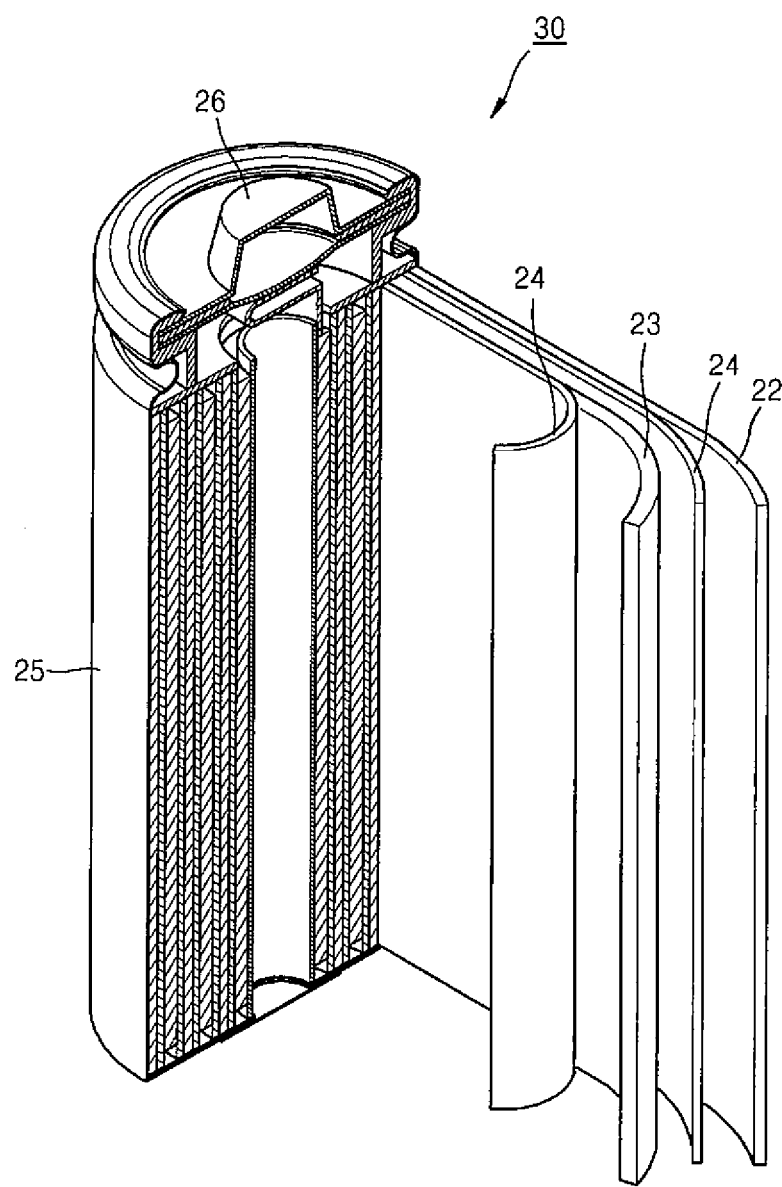
FIG. 3 is a schematic perspective view of a lithium battery according to an embodiment of the present invention.

FIG. 3 is a schematic view of a lithium battery 30 according to an embodiment of the present invention.

Referring to FIG. 3, the lithium battery 30 includes a positive electrode 23, a negative electrode 22 and a separator 24 interposed between the positive electrode 23 and the negative electrode 22. The positive electrode 23, the negative electrode 22, and the separator 24 are wound or folded to be placed in a battery case 25. Subsequently, an electrolyte is supplied into the battery case 25 and the resultant structure is sealed with a sealing member 26, thereby completing the manufacturing of the lithium battery 30. The battery case 25 may be a cylindrical, rectangular, or thin-film shape. The lithium battery may be a lithium ion battery.

The lithium battery may be suitable for, in addition to mobile phones and portable computers, applications requiring high capacity, high performance, and high-temperature driving, such as electric vehicles. In addition, the lithium battery may be combined with a typical internal combustion engine, a fuel battery, or a super capacitor for use in hybrid vehicles.

Embodiments of the present invention are further described in more detail with Examples and Comparative Examples. However, the Examples are presented herein for illustrative purpose only.

Example 1

1) Acid Treatment of Over-Lithiated Oxide (OLO) Active Material

An OLO active material (e.g., an over-lithiated lithium transition metal oxide) used herein had a composition of $0.55Li_2MnO_3$-$0.45LiNi_{0.5}Co_{0.2}Mn_{0.3}O_2$. 10 g of the OLO active material was added to 500 mL of an aqueous solution of 0.2M $HNO_3$ and then the mixture was stirred for 5 minutes, and then, a solution was removed therefrom by vacuum filtering and the resultant was dried at a temperature of 80° C. to obtain an acid-treated OLO active material.

2) Doping Treatment of Metal Cation 10 g of the acid treated OLO active material was added to 500 mL of an aqueous solution of 0.4 wt % Al nitrate, and then, the mixture was stirred at a temperature of 50° C. for 24 hours. After the stirring, the aqueous solution was removed by vacuum filtering and then, the resultant was dried at a temperature of 80° C., and then heat treated in atmospheric condition at a temperature of 300° C. for 5 hours. As a result, an Al cation-doped OLO active material was obtained.

3) Manufacturing of Coin Half Cell

Charging and discharging properties and voltage effects of the doped OLO active material was confirmed by using a coin half cell manufactured as described below.

The doped OLO active material powder and a carbon conductive agent (Super-P; available from Timcal Ltd.) were homogeneously mixed at a weight ratio of 90:5, and then, a polyvinylidene fluoride (PVDF) binder solution was added thereto to prepare an active material slurry including the active material, the carbon conductive agent, and the binder at a weight ratio of 90:5:5.

The active material slurry was coated on an aluminum foil having a thickness of 15 μm and then dried to form a positive electrode plate, and then additionally vacuum dried to manufacture a coin cell (CR2016 type) having a diameter of 12 mm.

In manufacturing the coin cell, metal lithium was used as a counter electrode, a polypropylene separator (Celgard 3501) was used as a separator, and 1.3M $LiPF_6$ dissolved in a mixed solvent of ethylene carbonate (EC):diethyl carbonate (DEC) (a volumetric ratio of 3:7) was used as an electrolyte.

Example 2

A coin half cell was manufactured in the same manner as in Example 1, except that a Ga cation-doped OLO active material was prepared by using an aqueous solution containing 0.3 wt % Ga nitrate instead of Al nitrate.

Example 3

A coin half cell was manufactured in the same manner as in Example 1, except that a Ni cation-doped OLO active material was prepared by using an aqueous solution containing 0.4 wt % Ni nitrate instead of Al nitrate.

Example 4

A coin half cell was manufactured in the same manner as in Example 1, except that a Cr cation-doped OLO active material was prepared by using an aqueous solution containing 0.5 wt % Cr nitrate instead of Al nitrate.

Example 5

A coin half cell was manufactured in the same manner as in Example 1, except that a Mg-doped OLO active material was prepared by using an aqueous solution containing 1 wt % $MgNO_3$ instead of Al nitrate.

Example 6

A coin half cell was manufactured in the same manner as in Example 1, except that a Mg-doped OLO active material was prepared by using an aqueous solution containing 10 wt % $MgNO_3$ instead of Al nitrate.

Example 7

The acid treatment and the Al cation doping were performed in the same manner (or substantially the same manner) as in Example 1, except that an OLO active material to which fluorine was added in 6 mol % based on the total moles of the transition metal was used as the positive active material.

The Al-substituted fluorine-containing OLO active material powder and the carbon conductive agent (Super-P; Timcal Ltd.) were homogeneously mixed at a weight ratio of 90:5 and then, a polyvinylidene fluoride (PVDF) binder solution was added thereto to prepare an active material slurry containing the active material, the carbon conductive agent, and the binder at a weight ratio of 90:5:5.

Graphite powder as a negative electrode active material and the PVDF binder were mixed at a weight ratio of 1:1 to prepare a mixture and then, N-methylpyrrolidone was added thereto in such an amount that a solid content was 60 wt % to control viscosity of the mixture to prepare a negative electrode active material slurry. The negative electrode active material slurry was coated on a copper foil current collector having a thickness of 10 μm, and then, the resultant structure was dried and pressed to manufacture a negative electrode.

The positive electrode, the negative electrode, and a separator (product name: STAR20, available from Asahi) formed of polyethylene having a thickness of 20 μm were used, and an electrolyte was supplied thereto to complete the manufacturing of a 18650 type full cell. In this regard, the electrolyte was prepared by adding tris trimethylsilyl phosphate with an amount of 0.5 wt % based on the total weight of the electrolyte to 1.3M $LiPF_6$ in a mixed solvent of fluoroethylene carbonate, dimethylcarbonate, and 2,2,3,3-tetrafluoropropyl-1,1,2,2-tetrafluoroethyl ether as a fluoro ether solvent at a volume ratio of 25:72:3.

Comparative Example 1

A coin half cell was manufactured in the same manner as in Example 1, except that an OLO active material with a composition of $0.55Li_2MnO_3-0.45LiNi_{0.5}Co_{0.2}Mn_{0.3}O_2$ was used without the acid treatment or the doping with the metal cation.

Comparative Example 2

To confirm the effect of the acid treatment, a coin half cell was manufactured in the same manner as in Example 1, except that an OLO active material with a composition of $0.55Li_2MnO_3-0.45LiNi_{0.5}Co_{0.2}Mn_{0.3}O_2$ was subjected to the acid treatment only and the doping with the metal cation was not performed.

Evaluation Example 1

Confirmation of Acid Treatment Effect of OLO Active Material

Figure 4:
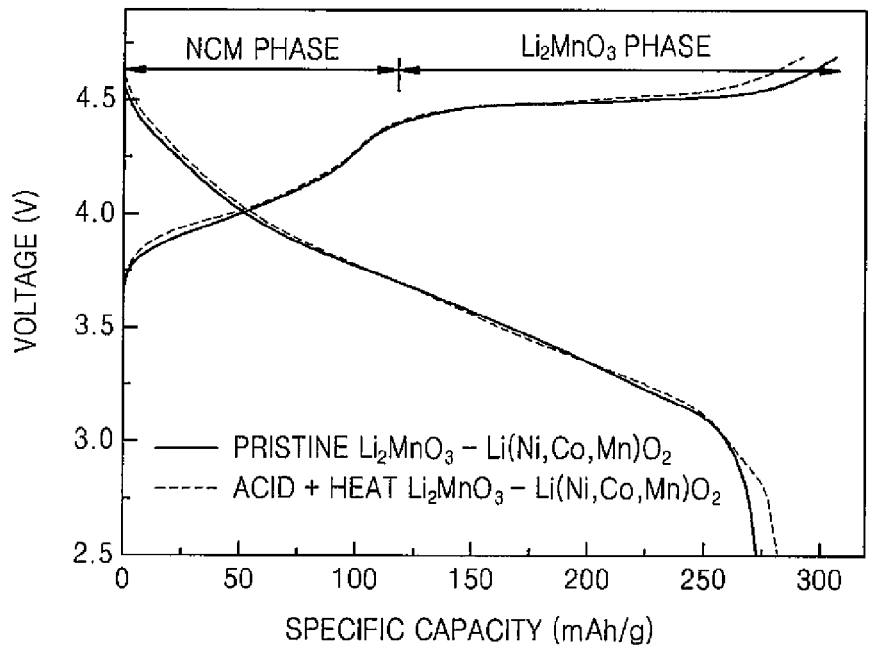
FIG. 4 is a graph showing charging curves of coin cells of Comparative Example 1 and Comparative Example 2 before and after an acid treatment, respectively, to illustrate an acid treatment effect on the over-lithiated oxide (OLO) active material used in Example 1.

Charging and discharging was performed as below to confirm the acid treatment effect of the OLO active material, and results thereof are shown in FIG. 4.

Regarding charging and discharging, the coin cells of Comparative Example 1 and Comparative Example 2 were charged with a constant current at a 0.2 C rate at a temperature of 25° C. until a voltage reached 4.3V (vs. Li), and while 4.31V was maintained, constant voltage charging was performed until the current reached 0.01 C. Subsequently, discharging was performed with a constant current of 0.2 C until the voltage reached 3.0V (vs. Li).

As shown in FIG. 4, when the charging curve was compared before and after the acid treatment, the charging curve (<4.5V) of the nickel-cobalt-manganese (NCM) phase does not change, and 4.5V plateau appearing due to activation of $Li_2MnO_3$ decreases according to the acid treatment.

In this regard, the decrease in charging amount of $Li_2MnO_3$ occurs when the acid treatment is performed, a Li ion is substituted with a hydrogen ion of an acid solution, and Li ion lacks in $Li_2MnO_3$ (e.g., an amount of Li ions in the $Li_2MnO_3$ phase has been reduced).

Figure 5:
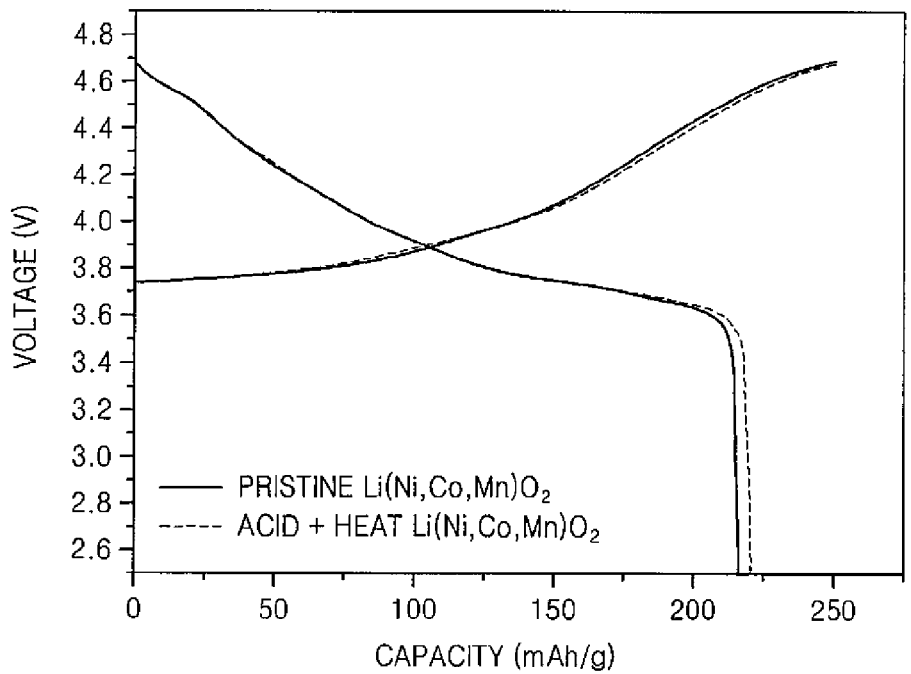
FIG. 5 is a graph illustrating the change in charging and discharging of a $\text{LiNi}_{0.5}\text{Co}_{0.2}\text{Mn}_{0.3}\text{O}_2$ active material before and after being treated with an acid.
Figure 6:
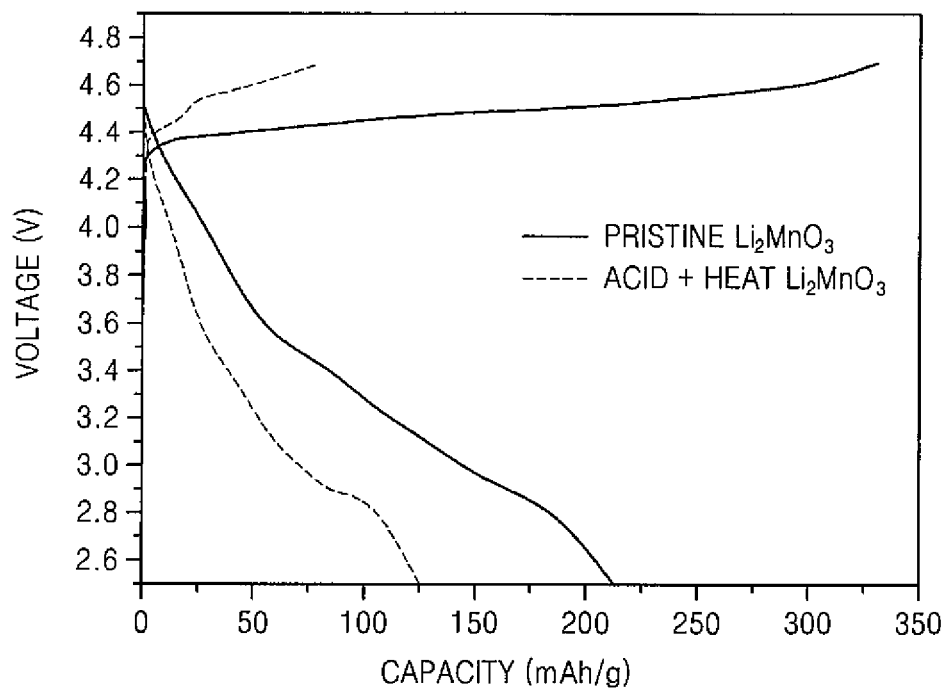
FIG. 6 is a graph illustrating the change in charging and discharging of a $\text{Li}_2\text{MnO}_3$ active material before and after being treated with an acid.

Meanwhile, as a control, charging and discharging change graphs of a $LiNi_{0.5}Co_{0.2}Mn_{0.3}O_2$ active material and a $Li_2MnO_3$ active material which constitute the OLO active material having a composition of $0.55Li_2MnO_3-0.45LiNi_{0.5}Co_{0.2}Mn_{0.3}O_2$ before and after the acid treatment are shown in FIGS. 5 and 6, respectively.

Referring to FIGS. 5 and 6, the charging and discharging curve of $LiNi_{0.5}CO_{0.2}Mn_{0.3}O_2$ active material does not change when the acid treatment is performed, and a Li ion was not deintercalated according to (or as a result of) the reaction with an acid solution. On the other hand, the discharging curve of $Li_2MnO_3$ substantially changes after the acid treatment was performed, due to the substitution of $Li_+$ ion with $H^+$ of the acid solution. Accordingly, it can be derived that the substitution of $Li^+$ ion with $H^+$ during the acid treatment occurs in $Li_2MnO_3$, but does not occur at a detectable level in $LiNi_{0.5}Co_{0.2}Mn_{0.30}O_2$.

Evaluation Example 2

Confirmation of Acid Treatment and Cation Substitution Effects of OLO Active Material Charging and discharging results of the coin cells of Example 1, Comparative Example 1, and Comparative Example 2 obtained in the same conditions as described above are shown in FIG. 7.

Figure 7:
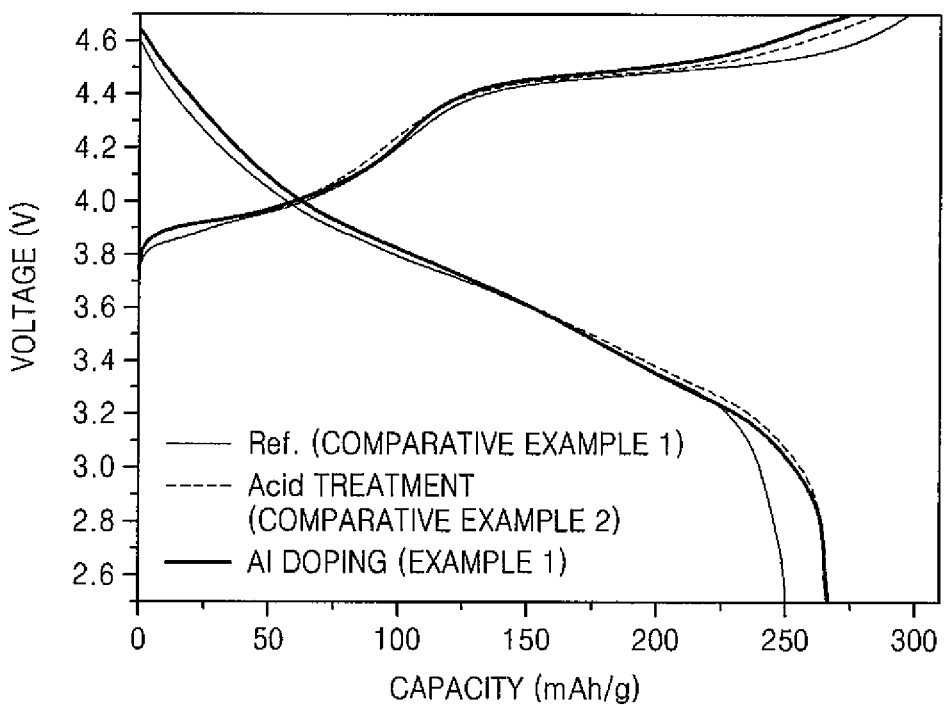
FIG. 7 is a graph showing charging and discharging results of coin cells manufactured according to Example 1, Comparative Example 1 and Comparative Example 2.

As shown in FIG. 7, although a discharging capacity was maintained when the acid treatment and the cation substitution of the OLO active material was maintained, charging capacity was decreased, leading to an increase in initial efficiency (that is, discharging capacity/charging capacity).

Herein, a decrease in charging capacity may be due to the Al cation added to $Li_2MnO_3$ blocking the deintercalation path of a Li ion from $Li_2MnO_3$.

Evaluation Example 3

TEM Analysis

Figure 8:
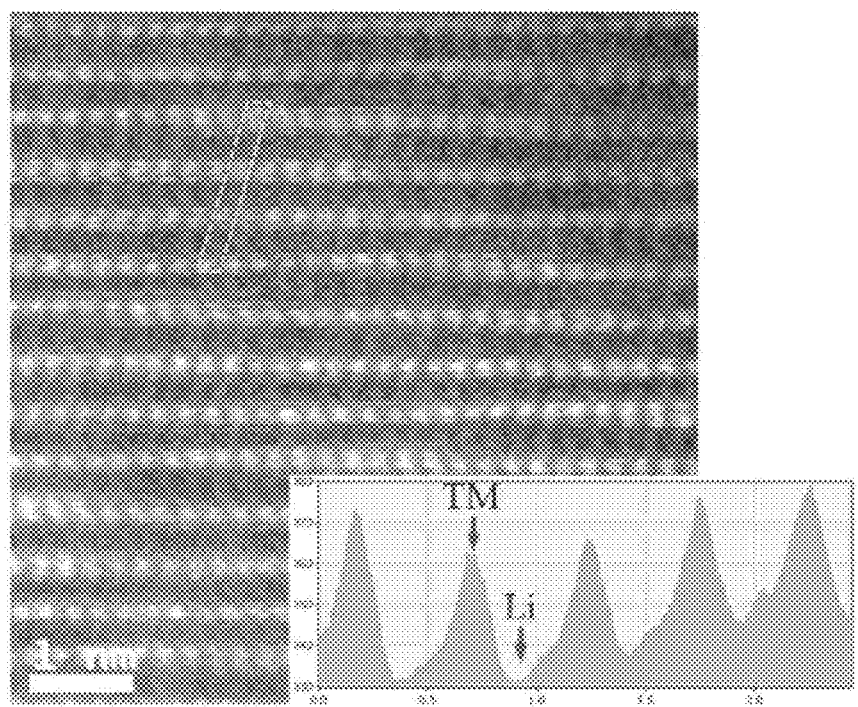
FIG. 8 shows TEM analysis results of an OLO active material having a composition of $0.55\text{Li}_2\text{MnO}_3\text{-}0.45\text{Li}\text{Ni}_{0.5}\text{Co}_{0.2}\text{Mn}_{0.3}\text{O}_2$ as used in Comparative Example 1.
Figure 9:
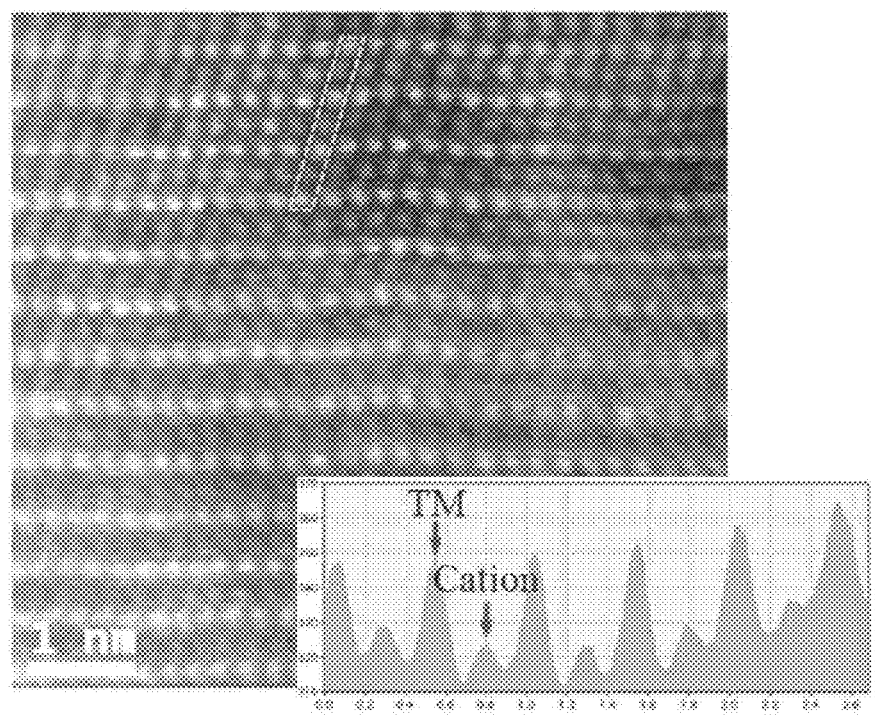
FIG. 9 shows TEM analysis results of an OLO active material doped with a cation after the acid treatment used in Example 1.

TEM analysis results of the OLO active material with a composition of $0.55Li_2MnO_3$-$0.45LiNi_{0.5}Co_{0.2}Mn_{0.3}O_2$ of Comparative Example 1 and the OLO active material of Example 1 that had been subjected to the acid treatment and cation-doped are shown in FIGS. 8 and 9, respectively.

As shown in FIGS. 8 and 9, TEM analysis results show that a Li ion layer of $Li_2MnO_3$ is doped with a cation.

Evaluation Example 4

Battery Properties Evaluation

Initial efficiency, capacity, and rate properties of the coin cells of Comparative Example 1 and Examples 1-4 were measured, and results thereof are shown in Table 1 below.

A charging and discharging test was performed with a 2032 coin half cell including lithium metal as a negative electrode. In this regard, a loading level (LL) of the positive electrode was fixed to 5.0 to 5.5 mg/cm², and a charging and discharging capacity of a first cycle was measured after a formation process including 4.7V charging (cc mode) with a current capacity of 0.1 C and 2.5V discharging (cc mode) at a current capacity of 0.1 C. When rate properties were measured, 4.6V charging (cc-cv mode, 0.05c cut) was performed at a 0.5 C current capacity and then, during 2.5V discharging (cc mode), current capacities of 0.2, 0.33, 1, 2, and 3 C were applied to measure a discharging capacity. Herein, the initial efficiency (I.E.) is defined as first cycle discharging capacity/first cycle charging capacity, and rate properties are defined as a ratio of discharging capacities as indicated below.

Evaluation Example 6

Nominal Voltage Change Measurement

Figure 10:
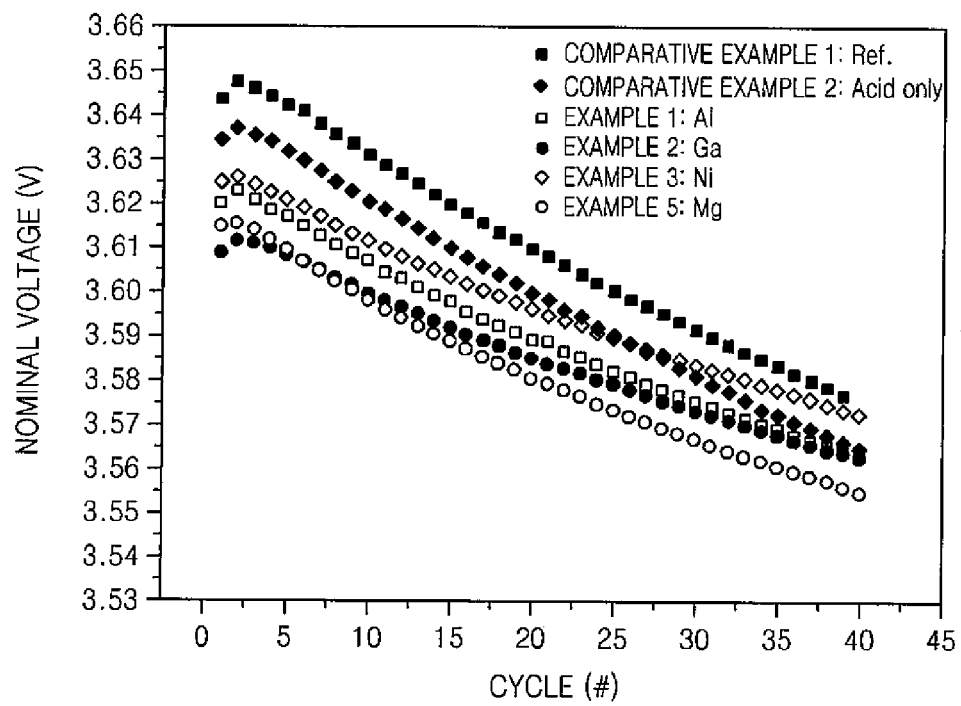
FIG. 10 is a graph of nominal voltage with respect to lifetime of coin cells manufactured according to Comparative Examples 1-2 and Examples 1-3 and 5.
Figure 11:
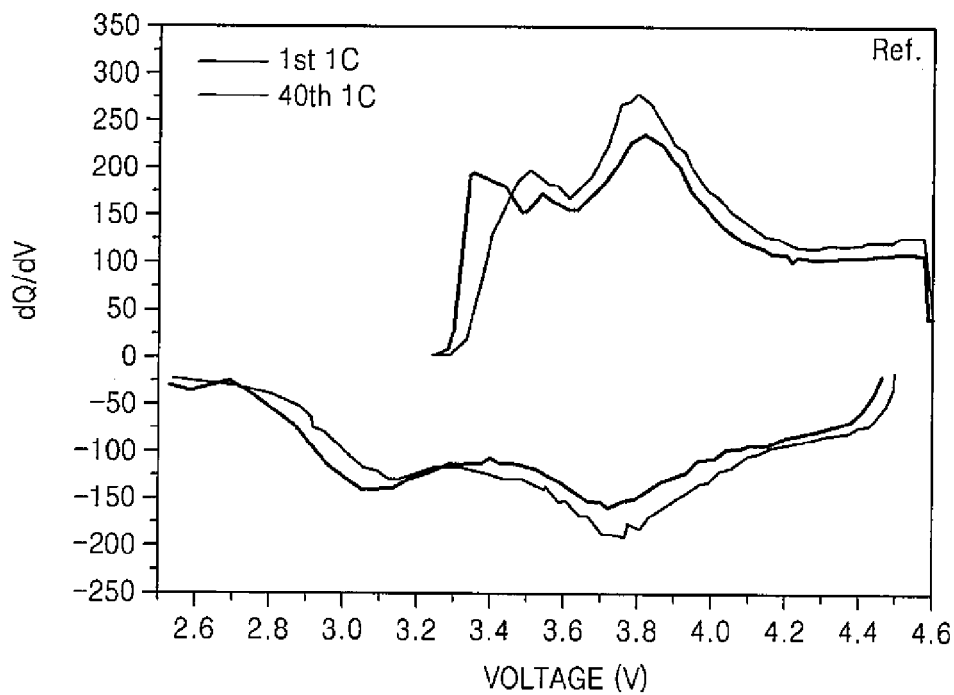
FIG. 11 is a graph showing a dQ/dV curve of a coin cell of Comparative Example 1 before and after 40 cycles.
Figure 12:
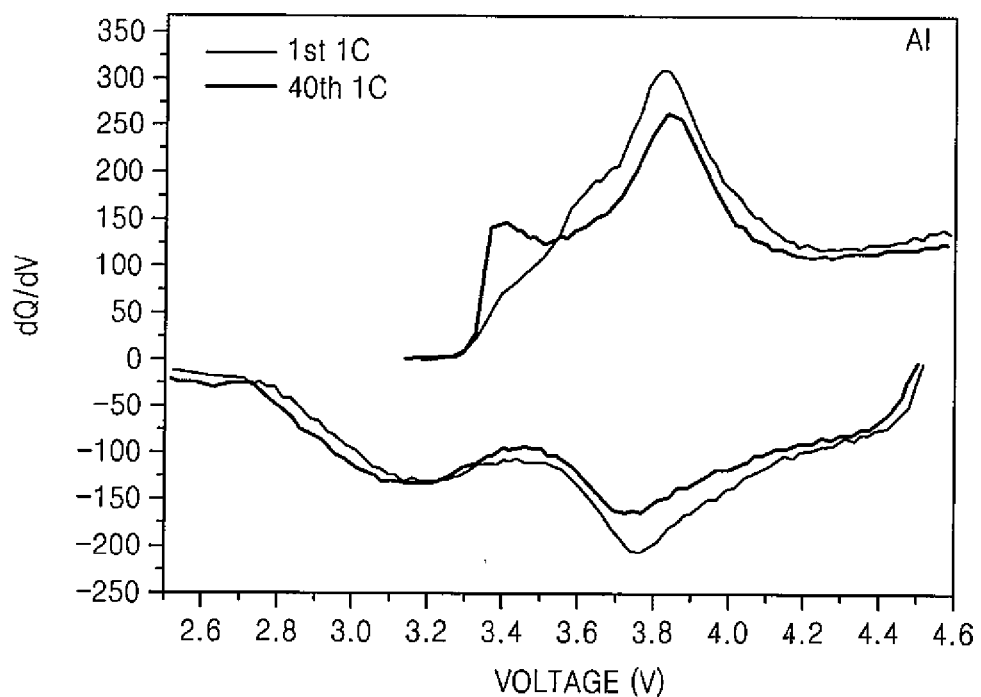
FIG. 12 is a graph showing a dQ/dV curve of a coin cell of Example 1 before and after 40 cycles.
Figure 13:
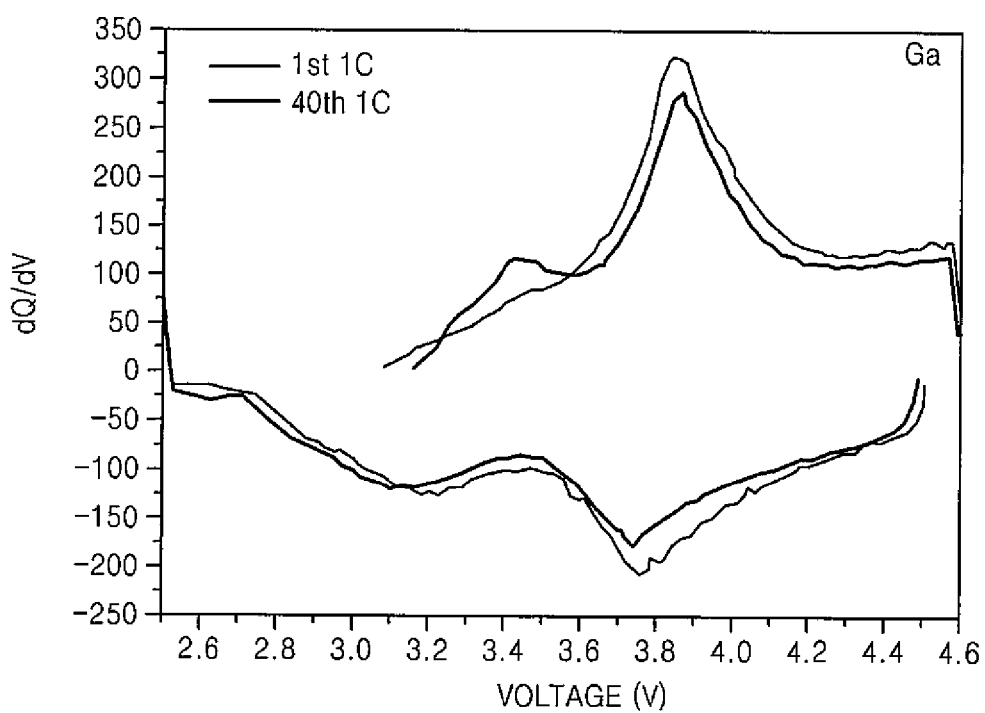
FIG. 13 is a graph showing a dQ/dV curve of a coin cell of Example 2 before and after 40 cycles.
Figure 14:
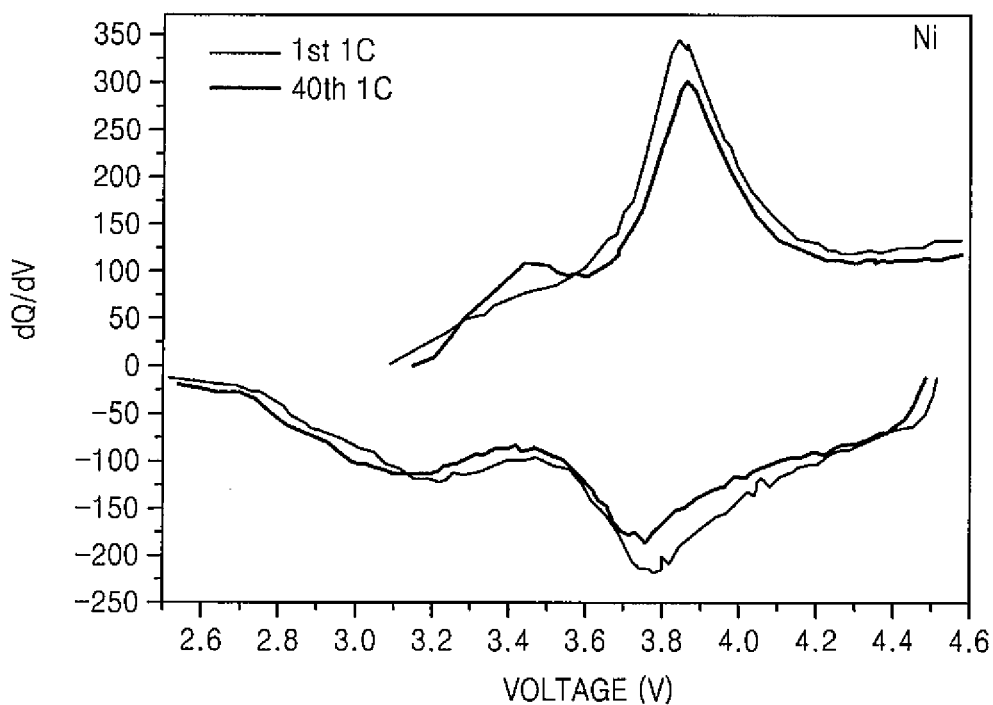
FIG. 14 is a graph showing a dQ/dV curve of a coin cell of Example 3 before and after 40 cycles.

An initial formation was performed on the coin cells of Comparative Examples 1-2 and Examples 1-3 and 5 with 0.05 C charging/0.05 C discharging, and then the coin cells were subjected to 0.5 C charging 10.5 C discharging for 40 times, and in each cycle, a nominal voltage was measured and results thereof are shown in FIG. 10.

As shown in FIG. 10, regarding a nominal voltage change in the respective coin cells, a voltage decrease of Examples 1-3 in which the acid treatment and the doping with metal cation were performed is relatively small compared to Comparative Example 1 in which the acid treatment and the doping with metal cation were not performed.

Evaluation Example 7 dQ/dV Curve Analysis

FIGS. 11 to 14 show dQ/dV curves of the coin cells of Comparative Example 1 and Examples 1-3 before and after 40 cycle lifetime. A dQ/dV curve shows results (dQ/dV, a vertical axis) obtained by differentiating charging and discharging capacity by the voltage (V, a horizontal axis).

In comparison of the dQ/dV curves of FIGS. 11 to 14, it was confirmed that a change in the $Li_2MnO_3$ discharge curve appearing at 3.3 V of Examples 1-3 is relatively suppressed compared to Comparative Example 1. From this result, it can be inferred that the phase change in $Li_2MnO_3$ is suppressed due to the substitution with the metal cation and accordingly, a decrease in voltage is decreased.

Evaluation Example 8

Analysis of Effect of Metal Cation Addition

To confirm the effect of metal cation addition, initial efficiency, capacity and rate properties of the coin cells of

TABLE 1

| | 1st cycle | | | Rate properties | | | | | | |
|---|---|---|---|---|---|---|---|---|---|---|
| Sample Name | 0.1C (mAh/g) | 0.1D (mAh/g) | I.E. (%) | 0.2D (mAh/g) | 0.33D (mAh/g) | 1D (mAh/g) | 2D (mAh/g) | 3D (mAh/g) | 1D/0.1D (%) | 3D/0.33D (%) |
| Comparative Example 1 (Ref.) | 296.6 | 251.7 | 0.85 | 231.1 | 222.1 | 200.5 | 185.1 | 175.1 | 0.80 | 0.79 |
| Example 1 (Al-doped) | 265.41 | 258.93 | 0.98 | 237.26 | 230.78 | 213.50 | 198.82 | 188.69 | 0.82 | 0.82 |
| Example 2 (Ga-doped) | 246.25 | 250.23 | 1.02 | 230.13 | 224.36 | 210.44 | 198.07 | 188.62 | 0.84 | 0.84 |
| Example 3 (Ni-doped) | 248.45 | 251.49 | 1.01 | 231.79 | 226.19 | 212.96 | 201.42 | 192.71 | 0.85 | 0.85 |
| Example 4 (cr-doped) | 268.6 | 262.2 | 0.98 | 237.3 | 228.9 | 210.2 | 196.5 | 187.3 | 0.80 | 0.82 |

As shown in Table 1, when a metal cation was doped as in Examples 1-4, initial efficiency increased to as high as about 100%, and compared to Comparative Example 1 in which the acid treatment and the doping were not performed, initial efficiency, capacity and rate properties were all improved.

Comparative Example 1 in which the acid treatment and the doping were not performed and Examples 5 and 6 in which Mg salt was respectively used in amounts of 1 wt % and 10 wt %, were measured in the same method as in Evaluation Example 4, and results thereof are shown in Table 2 below.

TABLE 2

| Sample Name | 1st cycle | | | Rate properties | | | | | | |
| --- | --- | --- | --- | --- | --- | --- | --- | --- | --- | --- |
| | 0.1C (mAh/g) | 0.1D (mAh/g) | I.E. (%) | 0.2D (mAh/g) | 0.33D (mAh/g) | 1D (mAh/g) | 2D (mAh/g) | 3D (mAh/g) | 1D/0.1D (%) | 2D/0.2D (%) |
| Comparative Example 1 | 282 | 274 | 97.1% | 251 | 241 | 217 | 193 | 174 | 79.3% | 76.9% |
| Example 5 | 275 | 268 | 97.3% | 244 | 235 | 210 | 186 | 168 | 78.3% | 76.2% |
| Example 6 | 246 | 242 | 98.5% | 223 | 214 | 191 | 170 | 154 | 79.0% | 76.3% |

As shown in Table 2, the greater the metal cation amount, the lower discharging capacity. This result may be due to the fact that as an amount of Mg added increases, Li ion is substituted with Mg and thus, an amount of Li ion participating in the charging and discharging reduces. Also, when the amount of Mg is too high, the migration of Li ions from $Li_2MnO_3$ during charging and discharging is blocked.

Evaluation Example 9

Metal Cation Doping Effect of Fluorine-Containing OLO Active Material

To confirm the effect of the acid treatment and the doping with metal cation on a fluorine-containing OLO active material, the OLO active material of Comparative Example 1 and the fluorine-containing OLO active material of Example 7 were respectively used as a positive electrode, and graphite was used as a negative electrode. A current corresponding to 1 C rate was applied to 18650 full cells manufactured by using the positive and negative electrodes described above, and charging and discharging were performed 300 times in a condition of 4.55V charging (cc mode) and 2.5V discharging (cc mode). Peaks of 100 and 200 cycles appeared due to the application of 0.2 C reference current, which was done to check capacity. A nominal voltage of each cycle was measured and results thereof are shown in FIG. 15.

Figure 15:
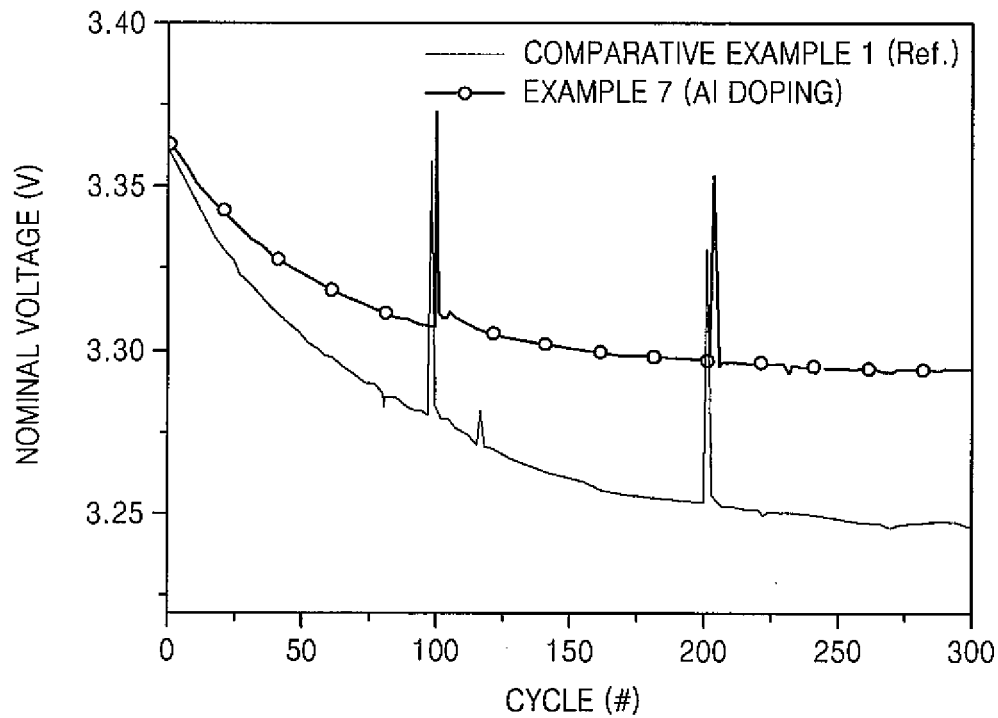
FIG. 15 is a graph of nominal voltage with respect to lifetime of full cells manufactured according to Comparative Example 1 and Example 7.

As shown in FIG. 15, even when the fluorine-containing OLO active material is used, a decrease in voltage is high due to the cation doping.

It should be understood that the embodiments described should be considered in a descriptive sense and not for purposes of limitation. For example, while the present invention has been described in connection with certain embodiments, it is to be understood that the invention is not limited to the disclosed embodiments, but, on the contrary is intended to cover various modifications and equivalent arrangements included within the spirit and scope of the appended claims, and equivalents thereof. Descriptions of features or aspects within each embodiment should typically be considered as available for other similar features or aspects in other embodiments.

BRIEF DESCRIPTION OF THE DRAWINGS

30: lithium battery
22: negative electrode
23: positive electrode
24: separator
25: battery case
26: encapsulation member

What is claimed is:

1. A composite positive active material comprising an over-lithiated lithium transition metal oxide, the over-lithiated lithium transition metal oxide comprising a compound represented by Formula 1 or Formula 3:

$xLi_{2-y}M''_yMO_3\text{-}(1-x)LiM'O_2$      [Formula 1]

in Formula 1, M being at least one metal selected from Period 4 transition metals and Period 5 transition metals and having an average oxidation number of +4,
M' being at least one metal selected from Period 4 transition metals and Period 5 transition metals and having an average oxidation number of +3,
M" being different from M and being at least one metal cation selected from Period 2 to Period 7 elements,
$0<x<1$, and $0<y\leq1$;

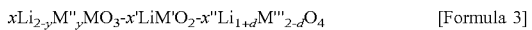

$xLi_{2-y}M''_yMO_3\text{-}x'LiM'O_2\text{-}x''Li_{1+d}M'''_{2-d}O_4$      [Formula 3]

in Formula 3, M being at least one metal selected from Period 4 transition metals and Period 5 transition metals and having an average oxidation number of +4,
M' being at least one metal selected from Period 4 transition metals and Period 5 transition metals and having an average oxidation number of +3,
M''' being at least one metal selected from Period 4 transition metals and Period 5 transition metals and having an average oxidation number from +3 to +4, and
M" being different from M, M' and M''' and being at least one metal cation selected from Period 2 to Period 7 elements,
$x+x'+x''=1$, $0<x<1$, $0<x'<1$, $0<x''<1$, $0<y\leq1$, and $0\leq d\leq0.33$,
wherein the over-lithiated lithium transition metal oxide has more than one phase.

2. The composite positive active material of claim 1, wherein, in Formula 1, M" is doped in a Li ion layer of $Li_{2-y}M''_yMO_3$.

3. The composite positive active material of claim 1, wherein $0<x<0.6$ and $0<y<0.1$.

4. The composite positive active material of claim 1, wherein the over-lithiated lithium transition metal oxide further comprises fluorine.

5. The composite positive active material of claim 1, wherein M is at least one metal selected from Mn, Ti, Zr, Sn, and Mo.

6. The composite positive active material of claim 1, wherein M' is at least one metal selected from Ni, Co, Mn, Fe, Al, Mg, Zn, Cu, Cr, V, and Nb.

7. The composite positive active material of claim 1, wherein M" is at least one metal cation selected from Mg, Al, Ca, Sc, Ti, V, Cr, Mn, Fe, Co, Ni, Cu, Zn, Ga, Sr, Y, Zr, Nb, Mo, Ru, Rh, Pd, Ag, Cd, and In.

8. The composite positive active material of claim 7, wherein M" is at least one metal cation selected from Al, Mn, Cr, Zn, Ga, Mg, V, and Zr.

9. The composite positive active material of claim 1, wherein the over-lithiated lithium transition metal oxide comprises a compound represented by Formula 2:

$$x\text{Li}_{2-y}\text{M}''_y\text{MnO}_3\text{-}(1\text{-}x)\text{LiNi}_a\text{Co}_b\text{Mn}_c\text{O}_2 \quad \text{[Formula 2]}$$

wherein $0<x<1$, $0<y\leq1$, $0<a<1$, $0<b<1$, $0<c<1$, $a+b+c=1$, and M″ is different from Mn and is at least one metal cation selected from Period 2 to Period 7 elements.

10. The composite positive active material of claim 1, wherein the over-lithiated lithium transition metal oxide is included in particles having an average particle size from about 10 nm to about 500 μm.

11. A lithium battery comprising:
a positive electrode comprising the composite positive active material of claim 1;
a negative electrode facing the positive electrode; and
an electrolyte between the positive electrode and the negative electrode.

12. A composite positive active material comprising an over-lithiated lithium transition metal oxide, the over-lithiated lithium transition metal oxide comprising a compound represented by Formula 9:

$$x\text{Li}_2\text{MO}_3\text{-}(1\text{-}x)\text{LiM}'\text{O}_2 \quad \text{[Formula 9]}$$

M being at least one metal selected from Period 4 transition metals and Period 5 transition metals and having an average oxidation number of +4, M′ being at least one metal selected from Period 4 transition metals and Period 5 transition metals and having an average oxidation number of +3, a portion y, wherein $0<y\leq1$, of Li in a Li ion layer of the over-lithiated lithium transition metal oxide being replaced with at least one metal cation selected from Period 2 to Period 7 elements, and $0<x<1$, wherein the over-lithiated lithium transition metal oxide has more than one phase.

* * * * *